United States Patent [19]
Gorday et al.

[11] Patent Number: 6,091,716
[45] Date of Patent: Jul. 18, 2000

[54] RECEIVE SIGNAL QUALITY ESTIMATES SUITABLE FOR PAGERS USED IN SATELLITE-BASED COMMUNICATION SYSTEMS

[75] Inventors: Robert Mark Gorday, West Palm Beach; Gregory O. Snowden, Boca Raton; Craig Christmas, West Palm Beach; Stuart Kreitzer, Coral Springs; Kenneth C. Elkin, Lake Worth; Leonard Bennett, Plantation, all of Fla.

[73] Assignee: Motorola, Inc., Schaumburg, Ill.

[21] Appl. No.: 09/108,420

[22] Filed: Jul. 1, 1998

[51] Int. Cl.[7] ....................................................... H04Q 7/00
[52] U.S. Cl. ........................... 370/314; 370/321; 455/421; 455/226.1; 455/67.7; 340/825.44
[58] Field of Search .................................... 370/314, 311, 370/321, 332, 333, 337; 455/421, 427, 135, 134, 226.1–226.4, 67.7; 340/825.44, 825.49

[56] References Cited

U.S. PATENT DOCUMENTS

| | | |
|---|---|---|
| 4,851,820 | 7/1989 | Fernandez . |
| 5,032,835 | 7/1991 | DeLuca . |
| 5,049,875 | 9/1991 | DeLuca et al. . |
| 5,193,216 | 3/1993 | Davis ...................................... 455/67.7 |
| 5,257,019 | 10/1993 | Schwendeman et al. ......... 340/825.49 |
| 5,289,178 | 2/1994 | Schwendeman . |
| 5,323,421 | 6/1994 | LaRosa et al. .................... 455/226.1 X |
| 5,630,210 | 5/1997 | Marry et al. ...................... 455/226.4 X |
| 5,809,414 | 9/1998 | Coverdale et al. ...................... 455/421 |
| 5,815,801 | 9/1998 | Hamalainen et al. ........... 455/226.1 X |

*Primary Examiner*—Edwin C. Holloway, III
*Attorney, Agent, or Firm*—Philip P. Macnak

[57] ABSTRACT

A method of producing a receive signal quality estimate in a subscriber unit (SU) located in a given geographic area covered by a wireless communication system of a kind in which a base station transmits downlink signals in a group of successive time frames directed to a set of geographic areas including an area in which the SU is located, wherein each of the group of successive time frames has signals aimed at a corresponding one of the set of geographic areas. The method comprises the steps of activating a receiver in the SU to listen over a determined listening interval that at least partly coincides with the group of successive time frames; measuring a signal strength of at least one downlink signal received by the SU receiver during the determined listening interval within one of, a time frame of the group of successive time frames corresponding to a geographic area in which the SU is located, and one other time frame of the group of successive time frames corresponding to a geographic area other than the geographic area in which the SU is located; and producing an estimate of receive signal quality at the SU according to a result of the measuring step.

18 Claims, 5 Drawing Sheets

RECEIVE SIGNAL QUALITY ESTIMATES SUITABLE FOR PAGERS USED IN SATELLITE-BASED COMMUNICATION SYSTEMS

BACKGROUND OF THE INVENTION

1. Field of the Invention

The present invention relates generally to messaging devices or pagers, and particularly to a technique for providing receive signal quality estimates suitable for pagers used in satellite-based communications systems.

2. Discussion of the Known Art

Known messaging or "paging" systems use at least one base station to transmit messages or data to selected system pagers. Pagers and other user equipment assigned to a wireless communication system are generally referred to as subscriber units (SU's). Over a forward or "down-link" frequency channel, a base station transmits down-link signals containing information destined to individual SU's whose addresses are also encoded in the down-link signals.

It is contemplated that a wireless communication system capable of global coverage for all subscribers, will soon be available. The system, known as "IRIDIUM", is presently specified to include mobile telephony and one-way pager service world-wide using a number of communication satellites in low-earth orbit (LEO). A satellite-based pager service will overcome certain limitations of terrestrial based systems. At present, people traveling with pagers know that paging systems around the world are usually not compatible. The United States (900 MHZ FLEX), South Korea (322 MHZ FLEX), and France (VHF ERMES), all have different paging frequencies and protocols. While several paging service providers have achieved regional and even some international coverage, such services still exclude major portions of the world. The result is that paging subscribers have few options for roaming worldwide and, sometimes, even on a regional basis. By contrast, a satellite based system may operate according to a uniform protocol worldwide.

A given pager may not always be capable of receiving a message sent from an overhead satellite, however. For example, the pager may be inside a building that attenuates wireless messaging signals below a certain threshold needed for accurate reception by the pager. Pager reception is also affected by the size of a pager's antenna, which for ease of portability may not extend from the body of the pager itself. If a pager subscriber has the capability to determine when his or her pager is unable to receive messaging signals accurately from a system transmitter, whether terrestrial or satellite based, he or she can take appropriate steps, e.g., move to a more favorable location where received signal strength exceeds the required threshold. The degree to which a pager can decode signals at less than a defined optimum signal strength, is referred to as the pager's "link margin". In the mentioned IRIDIUM system, pager link margins of about 30 dB are presently expected.

So-called "receive signal strength" (RSS) circuits have been provided for terrestrial-based paging systems, to alert users that their pagers may be out of range from a base station transmitter, and that message signals addressed to their pagers may have been missed by their pagers. See, for example, U.S. Pat. No. 5,032,835 (July 1991); U.S. Pat. No. 4,851,820 (July 1989); U.S. Pat. No. 5,049,875 (September 1991); and U.S. Pat. No. 5,289,178 (February 1994). All relevant portions of these patents are incorporated by reference herein.

Because the link margins for pagers in a satellite-based system tend to be less than those for pagers in terrestrial based systems, it is preferable to include some form of RSS indicator on the former so that users can be made aware of current message reception conditions. As mentioned, RSS indicators are implemented in terrestrial-based SUs (including cellular telephone hand sets) so that users can reposition themselves or their pagers for better receive conditions. Due to significant differences between terrestrial and satellite-based communication systems, however, it is not possible simply to incorporate the known RSS measurement schemes into satellite system pagers.

Specifically, in urban areas where RSS indicators are most useful, downlink signals from a nearby terrestrial base transmitter are usually plentiful. Thus, a pager can always monitor an active messaging frequency channel and evaluate reception conditions by measuring the strength of signals addressed to other pagers grouped in a common geographic area or cell. The time needed for such a receive signal strength evaluation is typically only a few seconds.

In a satellite based communication system, individual service areas or cells may not be continuously active, however. Thus, message signal traffic available for reception in a given area at any one time is substantially limited. For example, in the IRIDIUM system 10, each system satellite services 48 contiguous cells. Only a small number of these cells may be active at any given time, and, at certain times, the 48 cells are illuminated by a satellite antenna only sequentially yielding a duty cycle of 1/48 per cell. Accordingly, the number of signals available to make a receive signal strength or quality estimate in any one cell is limited. Also, in the case of satellite based transmissions, a relatively large amount of signal processing is needed to receive and to decode message signals due to, e.g., Doppler effects in the case of LEO satellites. Thus, for satellite system pagers, relatively few opportunities may exist to provide an indication of receive signal quality promptly.

In addition, terrestrial-based cellular communication systems have link margins typically as much as 80 dB, i.e., enough for an RSS indicator to construct a power meter scale. For satellite signals, the limited available transmit power and extremely large path loss typically result in a much lower dynamic range for reception by system SUs. This significantly limits the range of RSS measurements that can be used to construct a power meter scale on satellite system pagers.

SUMMARY OF THE INVENTION

According to the invention, a method of producing a receive signal quality estimate in a subscriber unit (SU) located in a given geographic area covered by a wireless communication system of the kind in which a base station transmits downlink signals in a group of successive time frames to a set of geographic areas including the area in which the SU is located, and each of the time frames has signals aimed at a corresponding one of the geographic areas, includes activating a receiver in the SU to listen over a determined listening interval that at least partly coincides with the group of successive time frames, measuring a signal strength of at least one downlink signal received by the SU receiver during the determined listening interval, and producing an estimate of receive signal quality at the SU according to a result of the measuring step.

For a better understanding of the present invention, reference is made to the following description taken in conjunction with the accompanying drawing, and the scope of the invention will be pointed out in the appended claims.

DETAILED DESCRIPTION OF THE INVENTION

Figure 1:
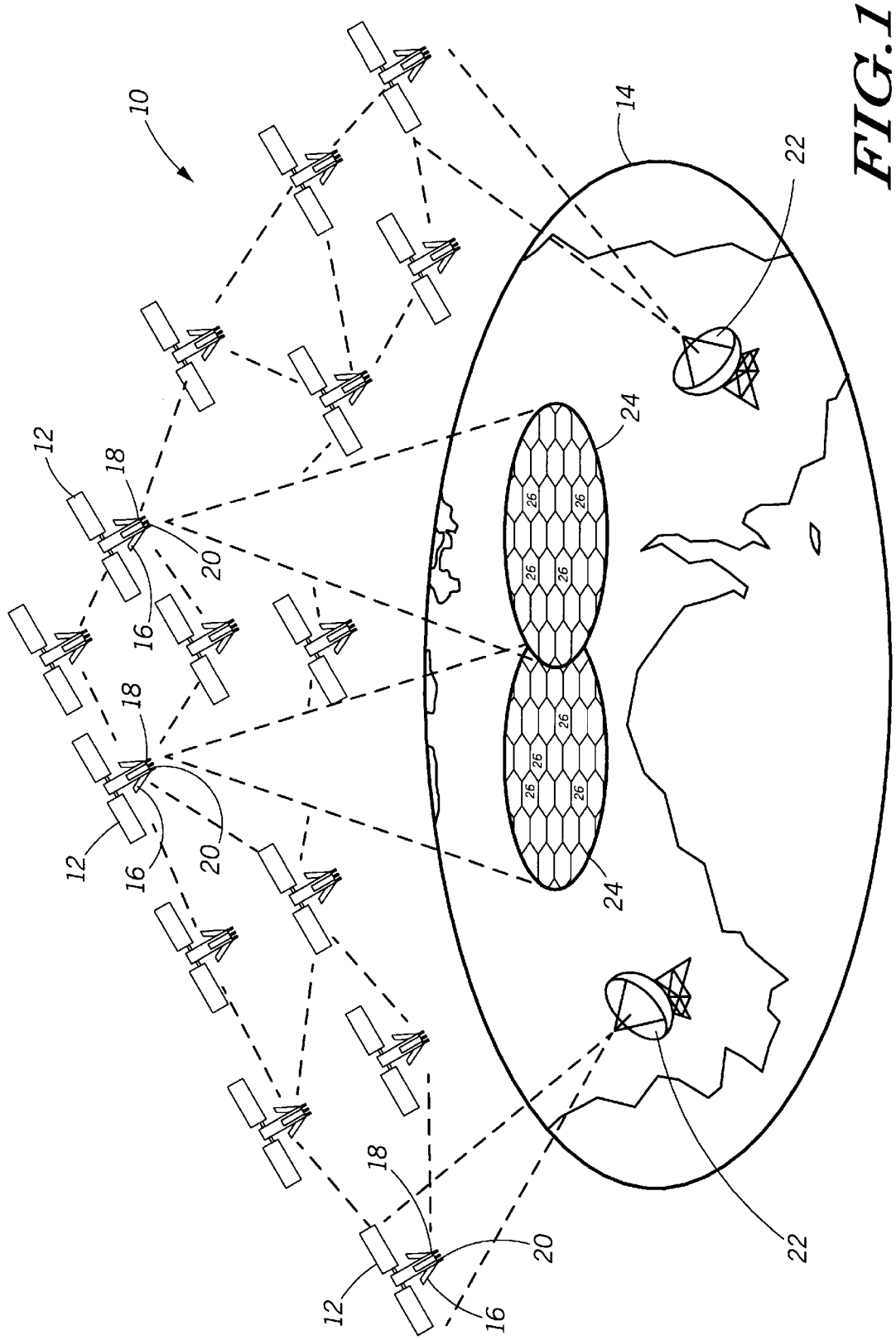
FIG. 1 is a pictorial representation of a satellite-based communication system in which the present invention can be applied.

FIG. 1 shows a satellite-based, global communication system 10 in which the present invention can be applied. For purposes of illustration and without limitation, the system 10 is a LEO satellite-based communication system known as the mentioned IRIDIUM system. It will be understood that the present invention can also be implemented in other kinds of satellite-based communication systems, and in certain terrestrial-based paging systems as well.

In the illustrated embodiment, the system 10 comprises a moving constellation of, for example, 66 operational LEO satellites 12. The satellites 12 are placed in six distinct planes in near polar orbit at an altitude of about 780 kilometers, and they circle the Earth 14. Use of the LEO satellites 12 enables the system 10 to achieve certain link margins permitting effective communication with portable, hand-held SUs including telephones and pagers, using mission antennas 16 comparatively smaller than antennas required on geostationary satellites.

Each satellite 12 communicates with subscriber units via the mission antennas 16, and with other system satellites 12 using cross-link antennas 18. Gateway antennas 20 on each satellite enables it to link with gateway Earth stations 22. Each gateway Earth station 22 provides interconnection between the system 10 and public switched telephone networks (PSTNs) all over the Earth 14, by connecting telephone calls or pager messages originating from local PSTNs to the system 10 and its portable SUs, and vice versa.

The mission antennas 16 associated with each satellite 12 communicate directly with ground SUs, by illuminating each one of a number of substantially non-overlapping regions 24 on the Earth's surface with 48 tightly focused antenna beams 26. The antenna beams 26 in each region 24 define contiguous geographic coverage areas or "cells" on the Earth's surface. The antenna beams produced by a single satellite 12 thus combine collectively to cover a generally circular area with a diameter of about 4,700 kilometers.

Figure 2:
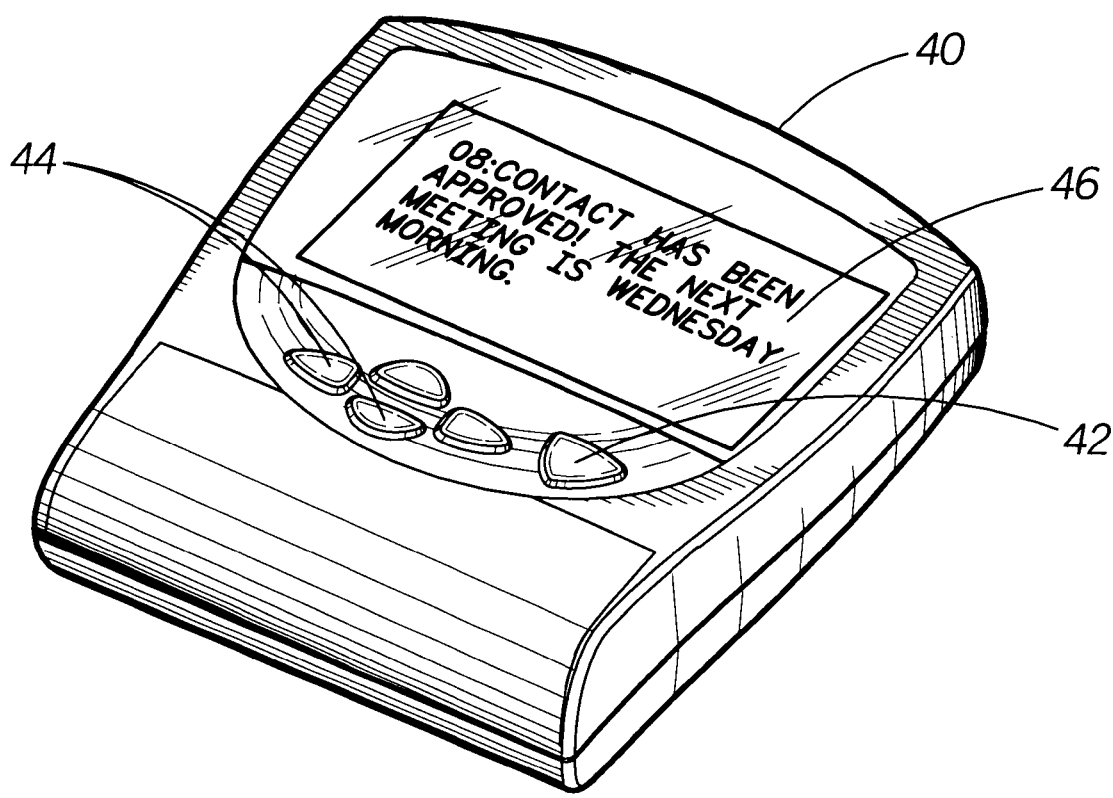
FIG. 2 shows a pager for use in the system of FIG. 1 and in which the present invention can be embodied.

FIG. 2 shows a pager or SU 40 for use in a wireless communication system that incorporates a messaging or paging protocol, such as the system 10. The pager 40 (sometimes referred to as a "messaging termination device" or MTD) has a menu select button 42, and a number of user-operated push buttons 44 for selecting pager features and for scrolling text messages presented on a pager display 46.

Figure 3:
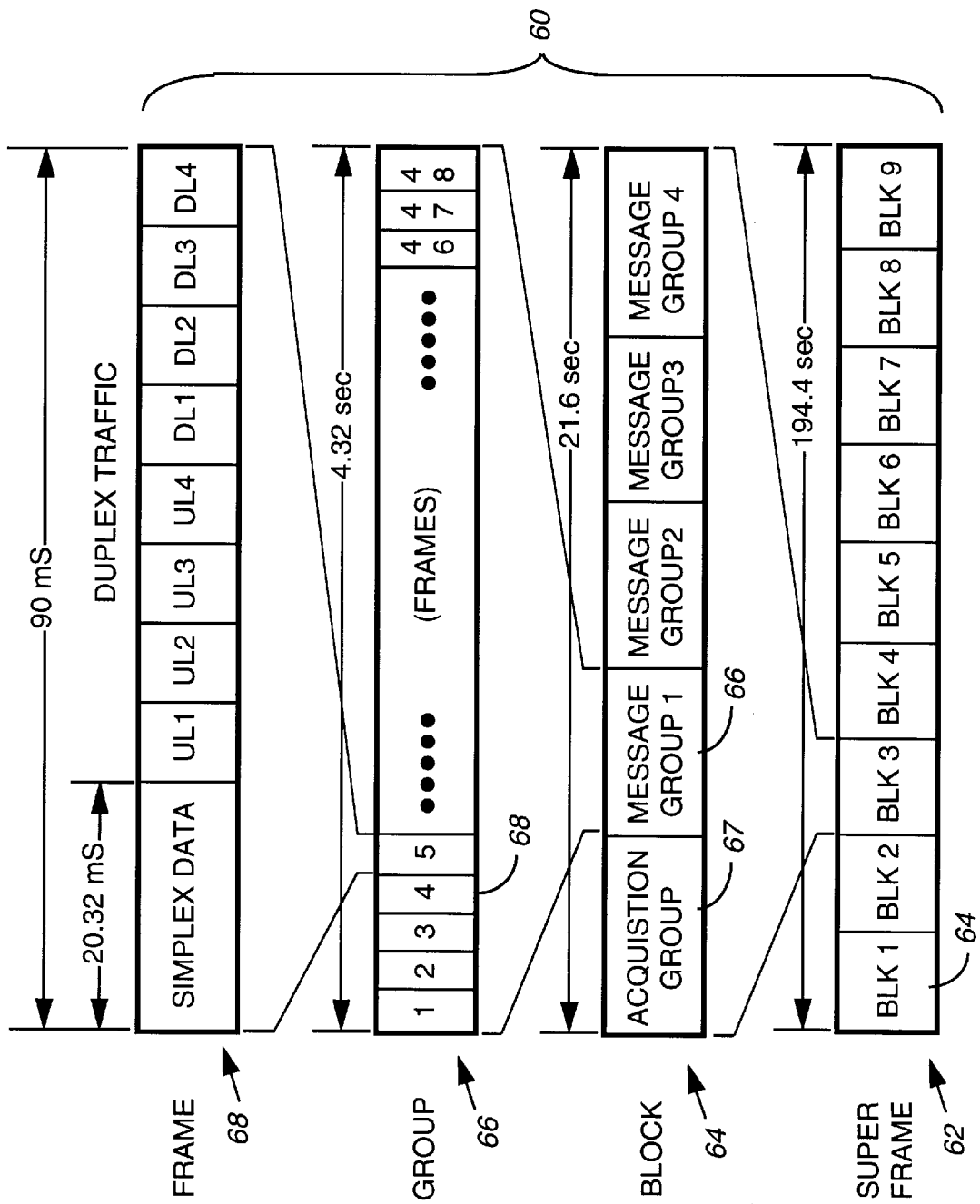
FIG. 3 is a timing diagram showing a communication system timing hierarchy for the system of FIG. 1.

FIG. 3 is an example of a system timing diagram 60 for the system 10 in FIG. 1. In the diagram 60, a system signaling protocol operates on a repeating cycle or "superframe" 62 of 194.4 seconds (3.24 minutes) duration. Each superframe 62 is partitioned into nine blocks 64, and each block is divided into four message groups 66 preceded by a known acquisition group 67. Each acquisition group 67 and each of the message groups 66 have 48 time frames 68. Each time frame 68 lasts 90 milli-seconds, and 20.32 msec of each time frame is allocated for simplex data, e.g., message signals addressed to specific system pager units. The balance of each frame 68 is allocated for duplex traffic, e.g., up-link (UL) and down-link (DL) telephone signals.

During each one of the 48 time frames of an acquisition group 67, the system 10 aims a known acquisition signal or "burst" from each satellite 12 to a corresponding one of the 48 cells 26 in each region 24 on the Earth. That is, at least one acquisition burst lasting 20.32 msec is beamed to a given cell 26 during each acquisition group 67.

Figure 4:
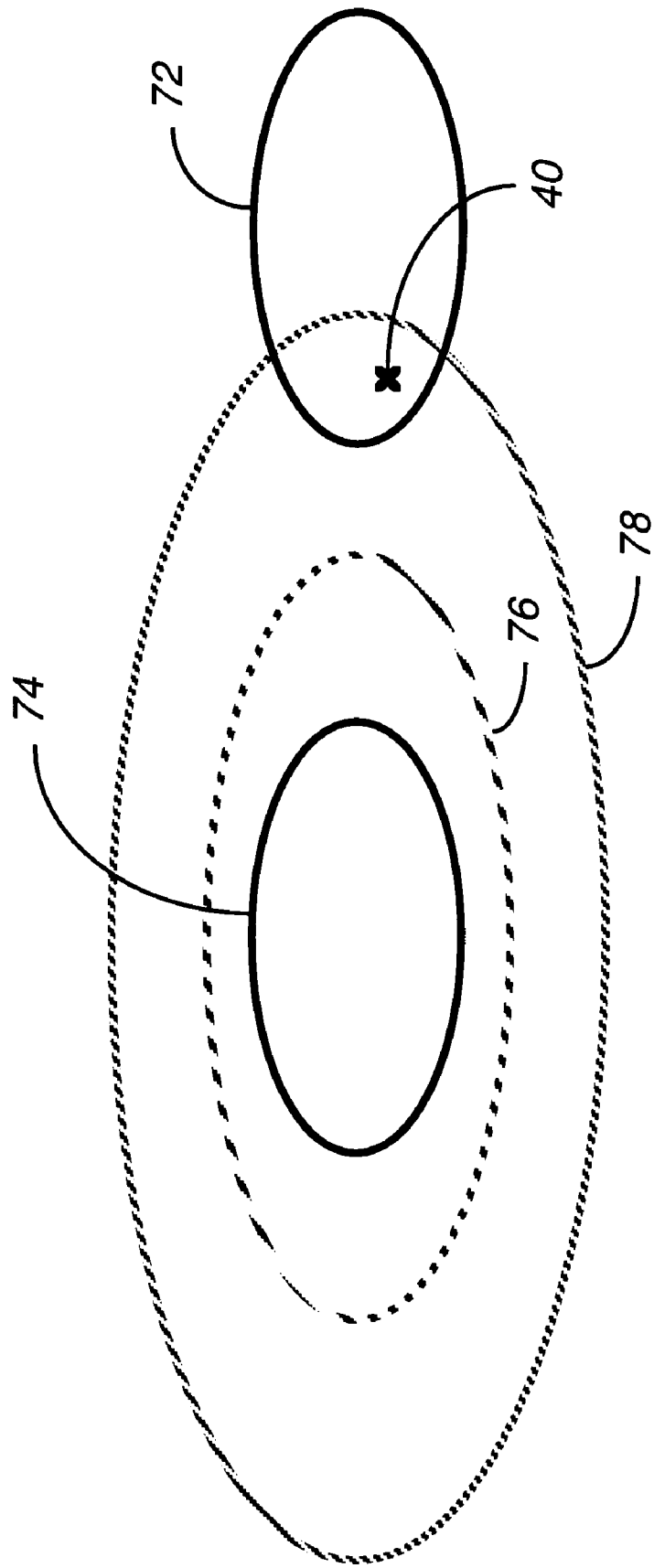
FIG. 4 is diagram illustrating overlapping antenna beam patterns in a satellite-based communication system.

FIG. 4 shows a service cell 72 assigned to a Beam A, and another service cell 74 assigned to a Beam B. Dashed line 76 indicates where Beam B's signal strength is 10 db down from its strength in its target cell 74, and dashed line 78 indicates where Beam B's signal strength is 20 db down. A given acquisition signal beam (e.g., Beam B) can exceed a receiver threshold in a SU or pager 40 located in a cell 72 other than a cell 74 to which Beam B is aimed. For example, in cell 72, the Beam B strength is about 18 dB down from that of Beam A, but still within a link margin of 30 dB for the pager 40 in cell 72.

Because the pager 40 may not always know which one of the 48 time frames in a given acquisition group corresponds to the cell in which the pager is located, the pager may be initially programmed so that its receiver listens only during an assigned one of the nine superframe blocks to reduce the pager's battery duty cycle, and during all 48 time frames of the block's acquisition group to ensure reception of at least one acquisition signal and to obtain synchronization information.

The mission antennas 16 of the orbiting system satellites 12 are preferably driven to illuminate a given cell with a substantially uniform RF field strength pattern. As noted above, the antennas' radiated fields may also be detected outside their assigned sectors or cells. That is, signals radiated via beam B may be detected in service cells assigned to other beams, including the service cell 72 assigned to beam A and in which the pager 40 is located. A mentioned above, the field strength of a Beam B signal within the Beam A service cell 72 is relatively attenuated, but can still be within the link margin of a receiver in the pager 40.

Thus, pager 40 remains capable of detecting signals carried on beams other than Beam A, and targeted at cells other than cell 72 in which the pager 40 is located. According to one aspect of the invention, when making a receive signal quality estimate for its own cell 72, the pager 40 also receives signals that are carried on beams aimed at cells (e.g., cell 74) other than the cell 72 in which the pager 40 is located. Details concerning the detection and processing of such signals by the pager 40 to produce a receive signal quality estimate for its own cell 72, are set out further below.

Figure 5:
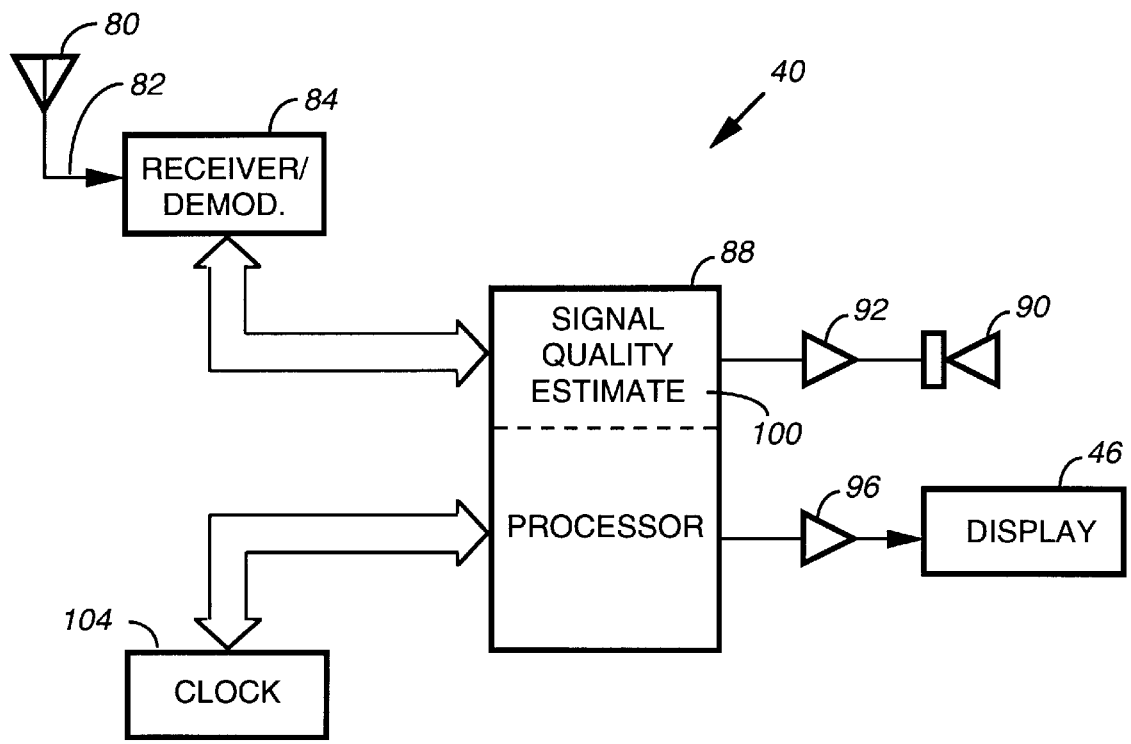
FIG. 5 is a block diagram of a pager according to the invention.

FIG. 5 is a schematic block diagram of the pager 40 in FIG. 4. An antenna element 80 is coupled to an antenna terminal 82 of a receiver/demodulator 84. The pager 40 also has a processor 88 which may be in the form of, for example, a digital signal processor (DSP) or a combination of a conventional microprocessor and an application specific integrated circuit (ASIC). Processor 88 may also be associated with a read-only-memory (ROM) for storing operating programs and information essential for pager control operations, a random access memory (RAM) that allows the processor 88 to acquire and to process data bearing on pager operations, and such interface circuitry as is needed to couple the processor 88 with address, data, and control bus lines. The receiver 84 operates under the control of the processor 88, and may use a piezoelectric crystal or an electronic frequency synthesizer for purposes of tuning to an assigned frequency channel, as is generally well-known in the art.

Processor 88 also has an associated clock 104. The clock 104 is used as a reference to derive information concerning any difference between received system timing control signals and internal pager timing. The pager 40 then compensates for such timing differences.

The pager 40 of the illustrated embodiment also includes a sound transducer (speaker) 90 coupled to an output of the processor 88 through a driver 92, and the display 46 seen in FIG. 2. Display 46 is coupled to an output of the processor 88 through a display driver 96.

Operating frequencies and demodulation protocols used in the pager receiver 84, correspond to those frequencies and protocols adopted a given communication system in which the pager 40 is to be used. For example, the IRIDIUM system operates in a frequency range of 1.6 GHz for communication with ground SUs, and uses both quadrature phase shift keying (QPSK) with a channel data rate of 50 kilobits per second, and differential phase shift keying (DPSK) with a data rate of 25 Kbps. A frequency division/time division multiple accessing (FDMA/TDMA) scheme is also contemplated for the system.

A signal quality evaluation stage 100 is also associated with the processor 88 in FIG. 5. The stage 100 may be incorporated within the processor 88 or take the form of a separate component or processor which is operatively coupled to the pager processor 88. The stage 100 is configured to store and to process signal strength measurements made by the pager receiver 84 for received acquisition signals, and to compute a corresponding receive signal quality estimate in response to a user request.

In the present embodiment, the stage 100 modifies or "filters" the signal strength measurements to produce an overall estimate of a current receive signal quality environment for the pager 40. The overall estimate is output from the processor 88 (or stage 100) for display. A dot-matrix display, an icon display 120 as in FIG. 6, or other equivalent display may be indicated on the display 46 to show several discrete levels of currently estimated receive signal quality conditions. For a histogram type display such as is commonly used on cellular telephone handsets, a full scale indication may not always guarantee that all message signals destined to the pager 40 will be received, and a minimum scale indication will not always mean that no message signal can be received. The scale will only represent a likelihood that message signals will be received and decoded without error as long as the pager 40 remains at a current location and position.

RSS indications may be implemented in either a "passive" or an "active" mode. For example, in the passive mode, an icon is selected via a user interface such as the menu select button 42 on the pager 40 (FIG. 2). The processor 88 then operates to display a last signal quality estimate determined during the pager's normal "wake" time, i.e., the signal strength estimate is based only on acquisition signal bursts received during the pager's assigned block 64. In the system 10, this information may be as much as 194.4 seconds (3.24 minutes) old, however. See FIG. 3.

By contrast, in the active RSS implementation, a user selects the signal strength icon and the processor 88 activates the receiver 84 to acquire a next available acquisition group 67 within an entire block 64. Signal strength measurements and estimates are based on acquisition burst signals received in the next available group 67, and the processor 88 (or stage 100) outputs a signal quality indication. The active mode thus makes it simpler for a user, for example, to place the pager 40 at an office window, press a button, and obtain a RSS estimate at that position in no more than 21.6+4.32=25.92 seconds with the system timing of FIG. 3. That is, the pager receiver is powered ON ahead of its normal wake time for its assigned block 64, in order to receive acquisition signal bursts transmitted within the next available block 64. An example of one configuration for mentioned passive and active modes is as follows:

(a) Passive signal strength indicator. Each superframe 62, the processor 88 selects and sends one signal estimate to the display driver 96. The selected estimate is taken as the maximum signal strength measured for acquisition signals received during the total 48 time frames of the acquisition group 67 in the one block 64 assigned to the pager 40. When the user selects a "signal strength" menu icon, the most recent selected estimate is displayed. The display 46 preferably "times-out" after a preset time. During an "out-of-range" condition, discussed below, the signal strength indicator is not displayed, and only an "out-of-range" indication is displayed.

(b) Active signal strength indicator. The user selects a corresponding menu icon to cause the processor 88 to activate the receiver 84 over the next available block 64, whether or not the block is assigned to the pager 40. A signal quality estimate is then displayed. Because the next block 64 is not necessarily the pager's assigned block, the processor 88 allows the receiver 84 to remain ON or to listen a sufficient time to ensure reception of an acquisition signal during an acquisition group 67 of the next available block 64. That is, 21.6+4.32=25.92 seconds ON. A receive signal quality estimate is displayed to the user, and the display 46 times out after the preset time. The user may repeat the menu selection process to obtain a later signal quality display. The signal quality estimate produced for display is selected by the pager processor as the maximum signal strength measured among all acquisition signals received during an active listening period.

In either of the above passive or active modes, the processor 88 can also store a time history of signal strength measurements made for all received acquisition signals, filter the measurements to reduce channel variation, and produce a filtered estimate for display to the user. Because the pager's initial sleep period may be set at approximately three minutes, however, a last-filtered estimate may be as much as three minutes old. To provide more recent RSS estimates, the above-described active mode allows the user to "wake up" the pager in the middle of a sleep period and to listen during a next available acquisition group, in order to produce a new RSS estimate for the user to view.

Two examples of the mentioned filtering are:

(1) Use a maximum value from all measurements made over a period of N time frames (e.g., N=48 frames=1 entire acquisition group 67); and (2) Rank received values from largest to smallest, and apply a weighted sum to account for expected fading distributions. Some examples of how rank ordering may be done, are:

a. Use the average of the top X signal strength measurements wherein X is a determined integer; or b. Use an estimate of the pager's geographic location to determine which acquisition signals are targeted to the pager's present cell 72, measure the targeted signal strengths, weigh any remaining received signals according to the distance of their associated cells from the pager's cell 72, and use a weighted average of all measured signal strengths as a signal strength indication. The pager 40 may be capable of determining its approximate geographic location by processing certain available information including acquisition signal bursts known to originate from different ones of the satellites 12.

In addition to using measured signal strength (or a time history of measured signal strengths) of received acquisition signals to produce a receive signal quality estimate for the pager display 46, either a measured signal power-to-noise power ratio, or a measured word error count wherein word errors are determined during received bit error correction processing, can be used as a basis for a displayed signal quality estimate.

In the above "passive mode", a signal quality estimate is generated once per superframe, by processing or "filtering" estimates of acquisition signal quality determined from signals received during an acquisition group 67 in the pager's assigned block 64. A history of RSS estimates from a number of successive superframes 62 can also be maintained and used to generate an "in-range/out-of-range" indication on the user display 46.

Figure 6:
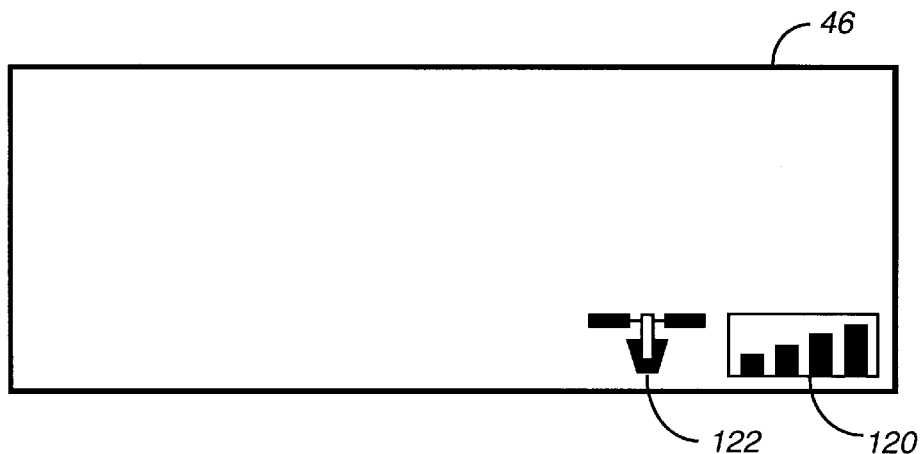
FIG. 6 shows an example of a receive signal quality estimate graphically displayed on the pager of FIG. 2.

In-range/out-of-range indicators are used on presently available SUs to notify a user when the unit is outside an area of service coverage. An exemplary in-range icon 122 is shown in FIG. 6. Such indicators are typically generated by the unit's processor and are based on a synchronous/asynchronous condition of the unit. A pager is usually considered to be synchronous when it has timing information that allows it accurately to predict (e.g., via timers) when a specific system protocol event such as a start of an arbitrary signal frame, will begin. Because of possible inaccuracies of clocks in the pager, the pager needs to receive system transmissions periodically in order to update its awareness of overall system timing. If the pager does not receive a transmission for a "long" period of time (typically, tens of minutes to an hour), the pager loses it's ability to predict the system protocol timing and is considered to be in an "asynchronous" condition.

In synchronous paging systems, such as the Iridium system 10, pager 40 may for example implement measures to compensate for frequency drift. Such will allow the pager to operate over relatively long periods of time before entering an asynchronous state. Accordingly, the synchronous/asynchronous condition of the pager may not provide a good indication of its in-range/out-of-range status. That is, the pager 40 may be in a synchronous condition yet still be unable to receive and decode a message signal currently transmitted.

An alternative to the use of sync/async status for an in-range/out-of-range indicator, is to make use of the presently disclosed signal quality estimates. Since a "passive mode" signal quality estimate is generated in the pager 40 for each superframe 62, a history of signal quality estimates from, e.g., the N most recent superframes 62 can be processed to generate an in-range/out-of-range indication for the pager display 46.

The processing or "filtering" used in producing an in-range/out-of-range indication according to the invention, may be based on the following:

1. If all of the signal quality estimates for N most recent superframes 62 are below a specified level, then the pager 40 is "out-of-range". If at least one of the N most recent superframe signal quality values is above the threshold, the pager is "in-range". If the threshold is set to indicate no signals received, then such a setting would yield results similar to the mentioned sync/async method, in that the pager must operate over at least N superframes with at least one received signal. An important distinction is that the in-range/out-of-range determination is decoupled from the sync/async status for the pager, and the determination becomes a function of RSS quality estimates.

2. Perform a weighted sum of the N most recent signal quality estimates, and compare them to a preset threshold to determine in-range or out-of-range status for the pager 40.

3. Perform a majority decision, where a majority of the N most recent signal quality estimates must be above a preset threshold to display an indication of an "in-range" status on the pager display 46. If the threshold is zero, then a majority of the N most recent superframes must have yielded at least one signal that was successfully decoded by the pager 40. A signal quality value of "zero" results when none of the 48 signals transmitted over the duration an acquisition group 67, is detected by the pager 40.

In addition to the mentioned "out of range" and RSS quality indications for the display 46, pager 40 may incorporate an "on-demand" signal strength measurement featuring an audible indication of signal strength after a given, e.g., 21.6 second measurement period. That is, an audible feedback feature can be included in the signal measurement process. Data bits received and successfully decoded by the receiver 84 are processed (for example, by counting of every N bits) and reproduced as audible "clicks" on the transducer 90 (FIG. 5), e.g., one click for every N bits. Thus, when a suitable signal strength environment is available, the user hears a series of clicks resembling the alarm sound of a Geiger counter. The clicks may also increase in volume as signal strength increases, and diminish when received signal strength is too weak. The audible feedback can be used to "fine tune" the pager's position, or simply to confirm that the pager 40 is in range.

In addition to indicating signal strength, the mentioned audible clicks can provide an indication of channel utilization. The audible signal strength indication feature is not limited in application to satellite-based communication systems, and can be implemented in most current, i.e., terrestrial-based systems as well.

While the foregoing description represents preferred embodiments of the invention, it will be obvious to those skilled in the art that various changes and modifications may be made without departing from the scope of the invention defined in accordance with the following claims.

What we claim is:

1. A method of producing a receive signal quality estimate in a subscriber unit (SU) located in a given geographic area covered by a wireless communication system of a kind in which a base station transmits downlink signals in a group of successive time frames directed to a set of geographic areas including an area in which the SU is located, and each of the group of successive time frames has signals aimed at a corresponding one of the set of geographic areas, comprising the steps of:

activating a receiver in the SU to listen over a determined listening interval that at least partly coincides with said group of successive time frames;

measuring a signal strength of at least one downlink signal received by the SU receiver during the determined listening interval, the at least one downlink signal which is measured being received within one of, a time frame of said group of successive time frames corresponding to a geographic area in which the SU is located, and one other time frame of said group of successive time frames corresponding to a geographic area other than the geographic area in which the SU is located; and producing an estimate of receive signal quality at the SU according to a result of the measuring step.

2. The method of claim 1, including storing signal strength measurements of a number of downlink signals received by the SU receiver during different listening intervals, and producing the estimate of receive signal quality according to the stored signal strength measurements.

3. The method of claim 1, including producing the estimate of receive signal quality in a form of a received signal strength.

4. The method of claim 1, including producing the estimate of receive signal quality in a form of a signal power-to-noise power ratio.

5. The method of claim 1, including producing the estimate of receive signal quality in a form of a word error count.

6. The method of claim 1, wherein the base station transmits the downlink signals in a group of N time frames, one time frame of said group of N time frames corresponding to the geographic area in which the SU is located, and N−1 time frames of said group of N time frames corresponding to geographic areas other than the geographic area in which the SU is located, and producing therefrom the estimate of receive signal quality in a form of a weighted sum of signal strength measurements made during up to N time frames.

7. The method of claim 6, including weighting the signal strength measurements according to a difference between an estimated geographical location of the SU, and an estimated location to which a given downlink signal is aimed.

8. The method of claim 1, including storing a number of receive signal quality estimates produced during periodic listening intervals of the SU receiver, and determining an in-range/out-of-range condition for the SU according to the stored estimates.

9. The method of claim 8, including comparing a number of most recent stored signal quality estimates with a determined threshold, and producing an out-of-range indication if all of the estimates are less than the determined threshold.

10. The method of claim 8, including comparing a number of most recent stored signal quality estimates with a determined threshold, and producing an out-of-range indication if a determined number of the stored estimates are less than the determined threshold.

11. The method of claim 8, including averaging a number of most recent stored signal quality estimates using a weighted sum, comparing a weighted average of the stored estimates with a determined threshold, and producing an out-of-range indication if the weighted average is less than the determined threshold.

12. The method of claim 1, including placing at least one base station of the wireless communication system on a satellite.

13. The method of claim 1, including producing an audible indication corresponding to a condition of receive signal quality at the SU.

14. The method of claim 13, including sounding the audible indication in a form of clicks.

15. The method of claim 13, including varying the volume of the audible indication according to measured strengths of received downlink signals.

16. In a wireless communication system wherein a satellite base station transmits downlink signals in a group of successive time frames directed to a set of geographic areas, and downlink signals in time frames are aimed at corresponding ones of the set of geographic areas, a method of producing a receive signal quality estimate in a subscriber unit (SU) assigned to the wireless communication system, comprising:

activating a receiver in the SU to listen over a determined listening interval that at least partly coincides with said group of successive time frames;

measuring a signal strength of at least one downlink signal received by the SU receiver during the determined listening interval, the at least one downlink signal which is measured being received within one of, a time frame of said group of successive time frames corresponding to a geographic area in which the SU is located, and one other time frame of said group of successive time frames corresponding to a geographic area other than the geographic area in which the SU is located; and producing an estimate of receive signal quality at the SU according to a result of the measuring step.

17. The method of claim 16, wherein the satellite base station transmits the downlink signals in said group of successive time frames at least once during each one of a group of successive time blocks, and activating the SU receiver to listen over an interval that corresponds to only one of the time blocks thus maintaining an optimum SU battery save duty cycle.

18. The method of claim 16, wherein the satellite base station transmits the downlink signals in said group of successive time frames at least once during each one of a group of successive time blocks, activating the SU receiver to listen over an interval that corresponds to more than one time block of a given group of time blocks in response to a user request, and, after a determined time lapse, causing the SU receiver to listen over an interval that corresponds to only one of the time blocks thus maintaining an optimum SU battery save duty cycle.

\* \* \* \* \*